(12) United States Patent
Shpiner et al.

(10) Patent No.: US 10,069,748 B2
(45) Date of Patent: Sep. 4, 2018

(54) CONGESTION ESTIMATION FOR MULTI-PRIORITY TRAFFIC

(71) Applicant: Mellanox Technologies TLV Ltd., Raanana (IL)

(72) Inventors: Alex Shpiner, Nesher (IL); Gil Levy, Hod Hasharon (IL)

(73) Assignee: MELLANOX TECHNOLOGIES TLV LTD., Raanana (IL)

(*) Notice: Subject to any disclaimer, the term of this patent is extended or adjusted under 35 U.S.C. 154(b) by 184 days.

(21) Appl. No.: 14/967,403

(22) Filed: Dec. 14, 2015

(65) Prior Publication Data

US 2017/0171099 A1    Jun. 15, 2017

(51) Int. Cl.
*H04W 28/02* (2009.01)
*H04L 12/863* (2013.01)
(Continued)

(52) U.S. Cl.
CPC ....... *H04L 47/6255* (2013.01); *H04B 7/0865* (2013.01); *H04L 43/0882* (2013.01); *H04L 43/16* (2013.01); *H04L 47/10* (2013.01); *H04L 47/32* (2013.01); *H04L 47/6275* (2013.01); *H04W 28/02* (2013.01); *H04L 47/11* (2013.01)

(58) Field of Classification Search
CPC .............. H04B 7/18584; H04B 7/0865; H04L 12/2472; H04L 47/10; H04L 47/12; H04L 47/11; H04W 28/02
See application file for complete search history.

(56) References Cited

U.S. PATENT DOCUMENTS 6,108,713 A    8/2000  Sambamurthy et al.
6,178,448 B1   1/2001  Gray et al.
(Continued)

FOREIGN PATENT DOCUMENTS

EP    1720295 A1    11/2006
EP    2466476 A1     6/2012
(Continued)

OTHER PUBLICATIONS

Gran et al., "Congestion Management in Lossless Interconnection Networks", Submitted to the Faculty of Mathematics and Natural Sciences at the University of Oslo in partial fulfillment of the requirements for the degree Philosophiae Doctor, 156 pages, Sep. 2013.

(Continued)

*Primary Examiner* — Salvador E Rivas
(74) *Attorney, Agent, or Firm* — D. Kligler IP Services Ltd.

(57) ABSTRACT

Communication apparatus includes multiple interfaces for connection to a packet data network and a memory configured to contain packets awaiting transmission to the network in multiple queues, which are assigned respective transmission priorities. Control logic assigns to the queues respective weighting factors, which vary inversely with the respective transmission priorities, and calculates for each egress interface a respective interface congestion level. The control logic calculates effective congestion levels for the queues as a weighted function of the respective queue lengths and the respective interface congestion level, weighted by the respective weighting factors, and applies congestion control to the queues responsively to the effective congestion levels.

12 Claims, 2 Drawing Sheets

(51) Int. Cl.
*H04L 12/865* (2013.01)
*H04L 12/823* (2013.01)
*H04L 12/26* (2006.01)
*H04B 7/08* (2006.01)
*H04L 12/801* (2013.01)

(56) References Cited

U.S. PATENT DOCUMENTS

| | | | |
|---|---|---|---|
| 6,594,263 | B1 | 7/2003 | Martinsson et al. |
| 7,321,553 | B2 | 1/2008 | Prasad et al. |
| 7,821,939 | B2 | 10/2010 | Decusatis et al. |
| 8,078,743 | B2 | 12/2011 | Sharp et al. |
| 8,345,548 | B2 | 1/2013 | Gusat et al. |
| 8,473,693 | B1 | 6/2013 | Muppalaneni et al. |
| 8,576,715 | B2 | 11/2013 | Bloch et al. |
| 8,767,561 | B2 | 7/2014 | Gnanasekaran et al. |
| 8,811,183 | B1 | 8/2014 | Anand et al. |
| 8,879,396 | B2 | 11/2014 | Guay et al. |
| 8,989,017 | B2 | 3/2015 | Naouri |
| 8,995,265 | B2 | 3/2015 | Basso et al. |
| 9,014,006 | B2 | 4/2015 | Haramaty et al. |
| 9,325,619 | B2 | 4/2016 | Guay et al. |
| 9,356,868 | B2 | 5/2016 | Tabatabaee et al. |
| 9,426,085 | B1 | 8/2016 | Anand et al. |
| 2002/0191559 | A1 | 12/2002 | Chen et al. |
| 2003/0108010 | A1 | 6/2003 | Kim et al. |
| 2003/0223368 | A1 | 12/2003 | Allen et al. |
| 2004/0008714 | A1 | 1/2004 | Jones |
| 2005/0053077 | A1 | 3/2005 | Blanc et al. |
| 2005/0169172 | A1 | 8/2005 | Wang et al. |
| 2005/0216822 | A1 | 9/2005 | Kyusojin et al. |
| 2005/0226156 | A1 | 10/2005 | Keating et al. |
| 2005/0228900 | A1 | 10/2005 | Stuart et al. |
| 2006/0088036 | A1 | 4/2006 | De Prezzo |
| 2006/0092837 | A1 | 5/2006 | Kwan et al. |
| 2006/0092845 | A1 | 5/2006 | Kwan et al. |
| 2007/0097257 | A1 | 5/2007 | El-Maleh et al. |
| 2007/0104102 | A1 | 5/2007 | Opsasnick |
| 2007/0104211 | A1 | 5/2007 | Opsasnick |
| 2007/0201499 | A1 | 8/2007 | Kapoor et al. |
| 2007/0291644 | A1 | 12/2007 | Roberts et al. |
| 2008/0037420 | A1 | 2/2008 | Tang et al. |
| 2008/0175146 | A1* | 7/2008 | Van Leekwuck ....... H04L 47/10 370/230 |
| 2008/0192764 | A1 | 8/2008 | Arefi et al. |
| 2009/0207848 | A1 | 8/2009 | Kwan et al. |
| 2010/0220742 | A1 | 9/2010 | Brewer et al. |
| 2013/0014118 | A1 | 1/2013 | Jones |
| 2013/0039178 | A1 | 2/2013 | Chen et al. |
| 2013/0250757 | A1 | 9/2013 | Tabatabaee et al. |
| 2013/0250762 | A1 | 9/2013 | Assarpour |
| 2013/0275631 | A1 | 10/2013 | Magro et al. |
| 2013/0286834 | A1* | 10/2013 | Lee ....................... H04L 47/326 370/235 |
| 2013/0305250 | A1 | 11/2013 | Durant |
| 2014/0133314 | A1 | 5/2014 | Mathews et al. |
| 2014/0269324 | A1* | 9/2014 | Tietz ....................... H04L 45/28 370/237 |
| 2015/0026361 | A1 | 1/2015 | Matthews et al. |
| 2015/0055478 | A1* | 2/2015 | Tabatabaee ............. H04L 47/11 370/236 |
| 2015/0124611 | A1 | 5/2015 | Attar et al. |
| 2015/0127797 | A1 | 5/2015 | Attar et al. |
| 2015/0180782 | A1 | 6/2015 | Rimmer et al. |
| 2015/0200866 | A1 | 7/2015 | Pope et al. |
| 2015/0381505 | A1 | 12/2015 | Sundararaman et al. |
| 2016/0135076 | A1* | 5/2016 | Grinshpun ....... H04W 28/0284 370/235 |
| 2017/0118108 | A1 | 4/2017 | Avci et al. |
| 2017/0142020 | A1 | 5/2017 | Sundararaman et al. |
| 2017/0180261 | A1 | 6/2017 | Ma et al. |
| 2017/0187641 | A1 | 6/2017 | Lundqvist et al. |

FOREIGN PATENT DOCUMENTS

| | | |
|---|---|---|
| WO | 2009107089 A2 | 9/2009 |
| WO | 2013136355 A1 | 9/2013 |
| WO | 2013180691 A1 | 12/2013 |

OTHER PUBLICATIONS

Pfister et al., "Hot Spot Contention and Combining in Multistage Interconnect Networks", IEEE Transactions on Computers, vol. C-34, pp. 943-948, Oct. 1985.
Zhu et al."Congestion control for large-scale RDMA deployments", SIGCOMM'15, pp. 523-536, Aug. 17-21, 2015.
U.S. Appl. No. 14/994,164 office action dated Jul. 5, 2017.
U.S. Appl. No. 15/075,158 office action dated Aug. 24, 2017.
CISCO Systems, Inc., "Priority Flow Control: Build Reliable Layer 2 Infrastructure", 8 pages, 2015.
CISCO Systems, Inc.,"Advantage Series White Paper Smart Buffering", 10 pages, 2016.
Hoeiland-Joergensen et al., "The FlowQueue-CoDel Packet Scheduler and Active Queue Management Algorithm", Internet Engineering Task Force (IETF) as draft-ietf-aqm-fq-codel-06 , 23 pages, Mar. 18, 2016.
U.S. Appl. No. 14/718,114 Office Action dated Sep. 16, 2016.
U.S. Appl. No. 14/672,357 Office Action dated Sep. 28, 2016.
Hahne et al., "Dynamic Queue Length Thresholds for Multiple Loss Priorities", IEEE/ACM Transactions on Networking, vol. 10, No. 3, pp. 368-380, Jun. 2002.
Choudhury et al., "Dynamic Queue Length Thresholds for Shared-Memory Packet Switches", IEEE/ACM Transactions Networking, vol. 6, Issue 2 , pp. 130-140, Apr. 1998.
Gafni et al., U.S. Appl. No. 14/672,357, filed Mar. 30, 3015.
Ramakrishnan et al., "The Addition of Explicit Congestion Notification (ECN) to IP", Request for Comments 3168, Network Working Group, 63 pages, Sep. 2001.
IEEE Standard 802.1Q™-2005, "IEEE Standard for Local and metropolitan area networks Virtual Bridged Local Area Networks", 303 pages, May 19, 2006.
INFINIBAND TM Architecture, Specification vol. 1, Release 1.2.1, Chapter 12, pp. 657-716, Nov. 2007.
IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.
IEEE Std 802.1Qbb., IEEE Standard for Local and metropolitan area networks—"Media Access Control (MAC) Bridges and Virtual Bridged Local Area Networks—Amendment 17: Priority-based Flow Control", 40 pages, Sep. 30, 2011.
Elias et al., U.S. Appl. No. 14/718,114, filed May 21, 2015.
Gafni et al., U.S. Appl. No. 15/075,158, filed Mar. 20, 2016.
Elias et al., U.S. Appl. No. 14/994,164, filed Jan. 13, 2016.
U.S. Appl. No. 15/063,527 office action dated Feb. 8, 2018.
U.S. Appl. No. 15/161,316 office action dated Feb. 7, 2018.
European Application # 17172494.1 search report dated Oct. 13, 2017.
European Application # 17178355 search report dated Nov. 13, 2017.
U.S. Appl. No. 15/081,969 office action dated Oct. 5, 2017.
U.S. Appl. No. 15/081,969 office action dated May 17, 2018.
U.S. Appl. No. 15/432,962 office action dated Apr. 26, 2018.
U.S. Appl. No. 15/161,316 Office Action dated Jul. 20, 2018.

* cited by examiner

CONGESTION ESTIMATION FOR MULTI-PRIORITY TRAFFIC

FIELD OF THE INVENTION

The present invention relates generally to packet communication networks, and particularly to methods and systems for control of congestion in such networks.

BACKGROUND

Network congestion occurs when a link or node in the network is required to carry more data traffic than it is capable of transmitting or forwarding, with the result that its quality of service deteriorates. Typical effects of congestion include queueing delay, packet loss, and blocking of new connections. Modern packet networks use congestion control (including congestion avoidance) techniques to try to mitigate congestion before catastrophic results set in.

A number of congestion avoidance techniques are known in the art. In random early detection (RED, also known as random early discard or random early drop), for example, network nodes, such as switches, monitor their average queue size and drop packets based on statistical probabilities: If a given queue (or set of queues) is almost empty, all incoming packets are accepted. As the queue grows, the probability of dropping an incoming packet grows accordingly, reaching 100% when the buffer is full. Weighted RED (WRED) works in a similar fashion, except that different traffic classes are assigned different thresholds.

Another congestion avoidance technique is Explicit Congestion Notification (ECN), which is an extension to the Internet Protocol (IP) and the Transmission Control Protocol (TCP). ECN was initially defined by Ramakrishnan, et al., in "The Addition of Explicit Congestion Notification (ECN) to IP," which was published as Request for Comments (RFC) 3168 of the Internet Engineering Task Force (2001) and is incorporated herein by reference. ECN provides end-to-end notification of network congestion without dropping packets, by signaling impending congestion in the IP header of transmitted packets. The receiver of an ECN-marked packet of this sort echoes the congestion indication to the sender, which reduces its transmission rate as though it had detected a dropped packet.

Other congestion avoidance techniques use adaptive routing, in which routing paths for packets are selected based on the network state, such as traffic load or congestion. Adaptive routing techniques are described, for example, in U.S. Pat. Nos. 8,576,715 and 9,014,006, whose disclosures are incorporated herein by reference.

SUMMARY

Embodiments of the present invention that are described hereinbelow provide improved methods and systems for congestion control in a network.

There is therefore provided, in accordance with an embodiment of the invention, communication apparatus, including multiple interfaces configured for connection to a packet data network as ingress and egress interfaces of the apparatus. A memory is coupled to the interfaces and configured to contain packets awaiting transmission to the network in multiple queues, which are associated with respective egress interfaces and are assigned respective transmission priorities. Control logic is configured to assign to the queues respective weighting factors, such that the weighting factors of the queues vary inversely with the respective transmission priorities of the queues. The control logic calculates for each egress interface a respective interface congestion level based on respective queue lengths of the queues associated with the egress interface, and calculates effective congestion levels for the queues as a weighted function of the respective queue lengths and the respective interface congestion level, weighted by the respective weighting factors, of the egress interfaces with which the queues are respectively associated. Congestion control is applied to the queues responsively to the effective congestion levels.

In the disclosed embodiments, the weighted function includes a weighted sum, in which the respective interface congestion level is weighted by the respective weighting factors of the queues. In one embodiment, the weighting factors are assigned values between zero, for the queues having a highest priority level, and one, for the queues having a lowest priority level.

In some embodiments, the control logic is configured to send congestion notifications over the network when an effective congestion level for a given queue exceeds a predefined threshold. Additionally or alternatively, the control logic is configured to drop packets from a queue when an effective congestion level of the queue exceeds a predefined threshold. Further additionally or alternatively, the control logic is configured to apply adaptive routing to reroute packets awaiting transmission in a queue when an effective congestion level of the queue exceeds a predefined threshold.

There is also provided, in accordance with an embodiment of the invention, a method for communication, which includes holding packets awaiting transmission from a network element to a network in multiple queues, which are associated with respective egress interfaces of the network element and are assigned respective transmission priorities. Respective weighting factors are assigned to the queues, such that the weighting factors of the queues vary inversely with the respective transmission priorities of the queues. For each egress interface, a respective interface congestion level is calculated based on respective queue lengths of the queues associated with the egress interface. Effective congestion levels are calculated for the queues as a weighted function of the respective queue lengths and the respective interface congestion level, weighted by the respective weighting factors, of the egress interfaces with which the queues are respectively associated. Congestion control is applied to the queues responsively to the effective congestion levels.

The present invention will be more fully understood from the following detailed description of the embodiments thereof, taken together with the drawings in which:

DETAILED DESCRIPTION OF EMBODIMENTS

Figure 1:
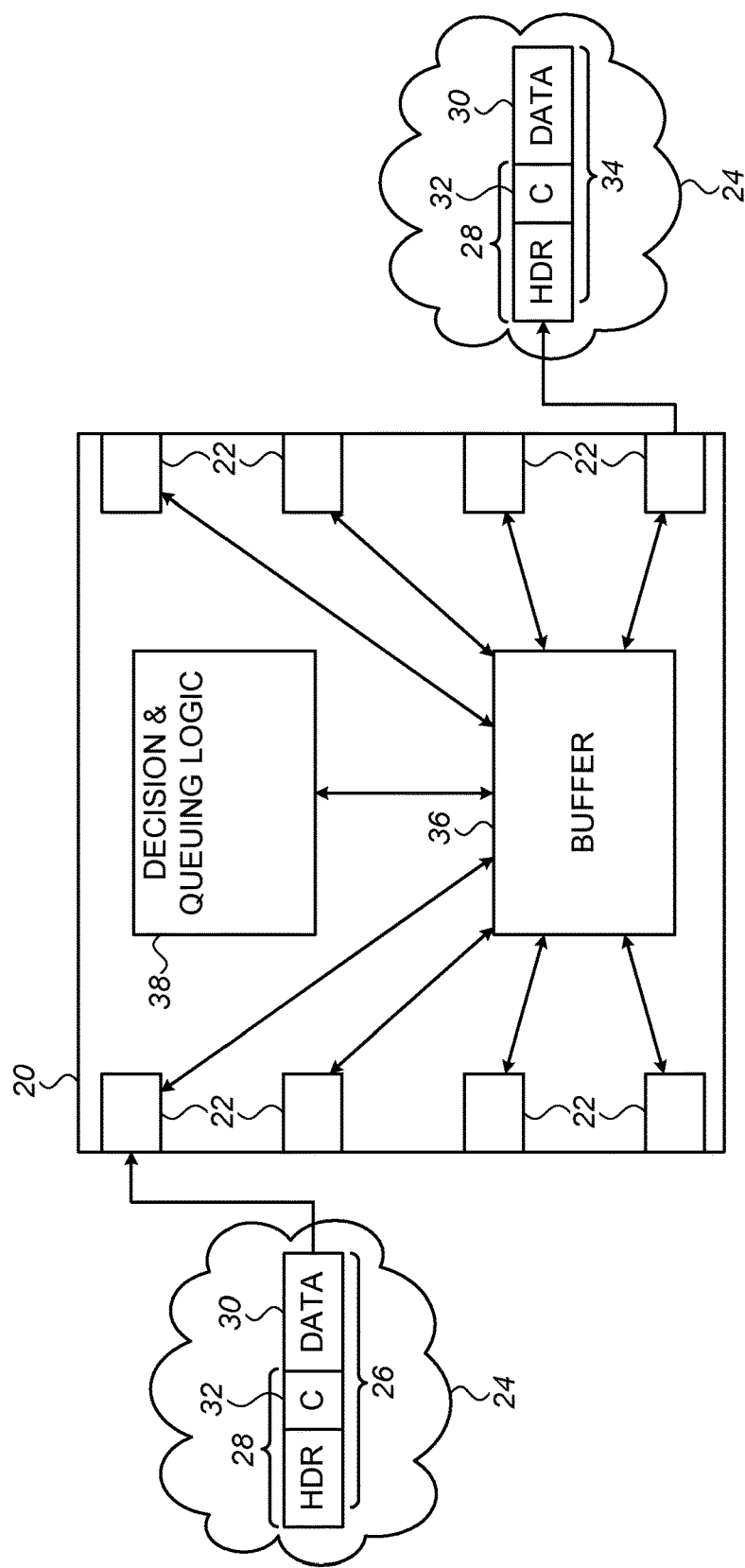
FIG. 1 is a block diagram that schematically illustrates a switch that implements congestion control, in accordance with an embodiment of the invention.

In statistical congestion control techniques that are known in the art, such as ECN and WRED, congestion control measures are applied to a certain fraction of the packets that are to be transmitted from each queue in a network element to the network, depending on the respective length of each queue. In other words, a certain threshold is defined for each queue, and the probability that a given packet will be marked with a congestion notification (such as in ECN) or dropped (such as in WRED) depends on the relation between the current length of that queue and the threshold.

In many cases, however, the egress interfaces of a network element, such as the ports of a switch, are configured to transmit packets in different traffic classes, with different, respective transmission priorities. In such cases, the packets for transmission through a given interface are held in multiple different queues, depending on their priorities, and the actual congestion that a packet faces depends not only on the length of its own queue, but also on the other queues that are competing for transmission bandwidth through the same interface. This effect becomes more marked for packets in low-priority queues, which may encounter long transmission delays even when their own queue is short, as high-priority packets in other queues take up most of the available bandwidth. Under these circumstances, it can be difficult or impossible to find an optimal working point for congestion control measures based on the queue length alone.

Embodiments of the present invention that are described herein address this problem by applying congestion control measures to each queue based on effective congestion levels. The effective congestion for each queue is calculated as (or estimated by) a weighted function of its own, respective queue length together with an interface congestion level of the egress interface with which the queue is associated. The interface congestion level is typically calculated based on the respective queue lengths of all the queues associated with the particular egress interface, for example, as a sum or average of the queue lengths. In calculating the effective congestion level for each queue, the interface congestion level is weighted, relative to the queue length itself, by a weighting factor that varies inversely with the respective transmission priorities of the queues, i.e., the interface congestion level receives a high weight for low-priority queues, and vice versa. Thus, generally speaking, the effective congestion level for low-priority queues will be strongly influenced by the overall interface congestion level, while high-priority queues will be influenced less or not at all.

The term "varies inversely," as used in the context of the present description and in the claims in reference to the weighting factor, means simply that as the priority increases, the weighting factor decreases, and this term applies to any sort of function that behaves in this way. For example, in some embodiments, the network element computes the effective congestion level for each queue as a weighted sum of the queue length and the interface congestion level, with the interface congestion level weighted in the sum by the respective weighting factor that is assigned to the queue. The weighting factors in this case are typically assigned values between zero, for the queues having the highest priority level, and one, for the queues having the lowest priority level. In embodiments of the present invention, the function that is used in setting the weighting factors can be configured as desired, depending on factors such as scheduling policies and network connectivity, and may even vary among different interfaces of the same network element.

The techniques disclosed herein thus enable a network element to optimize application of congestion control measures under different conditions, while imposing only a minimal additional computational burden relative to queue length-based methods that are known in the art. The effective congestion levels that are calculated in this manner may be used in place of the ordinary queue length in a variety of congestion control techniques, such as sending congestion notifications, dropping packets from a queue when necessary, and deciding when to apply adaptive routing.

FIG. 1 is a block diagram that schematically illustrates communication apparatus in the form of a network switch 20, in accordance with an embodiment of the invention. Switch 20 comprises multiple interfaces, such as switch ports 22, which are connected to a packet data network 24 and are typically configured to serve as both ingress and egress interfaces. In the pictured embodiment, switch 20 receives an incoming data packet 26 from network 24 through one of ports 22, serving as the ingress interface for the packet. Packet 26 comprises a header 28 and a data payload 30, as is known in the art. Header 28 may contain a congestion notification field 32, such as an ECN field. Switch 20 forwards a corresponding outgoing packet 34 through another port 22 that serves as the egress interface, while updating congestion notification field 32 and/or other header fields as appropriate.

Incoming packets received by switch 20, such as packet 26, are transferred to a memory 36, which buffers packets awaiting transmission to the network in multiple queues. Although only the single memory 36 is shown in FIG. 1, in practice switch 20 may typically comprise multiple memories or memory partitions, with associated data transfer and switching logic; but these elements are outside the scope of the present description and are omitted for the sake of simplicity. The term "memory," as used in the present description and the claims, should be understood as including all such memory configurations, including both unified and distributed memory devices and arrays.

Control logic 38 in switch 20 executes forwarding and queuing decisions, and thus assigns outgoing packets to appropriate queues for transmission to network 24. Each such queue is associated with a respective egress interface and is assigned a respective transmission priority. Typically, as noted earlier, multiple queues, with different, respective priority levels, are associated with each egress interface. Control logic 38 monitors the length of each queue and calculates an effective congestion level for the queue as a weighted function of its own queue length and an interface congestion level, which is based on the queue lengths of all the queues that are associated with the same egress interface.

Control logic 38 decides whether and how to apply congestion control measures to outgoing data packets in each queue, by comparing the effective congestion level of the queue to a respective threshold. The congestion measures typically include statistical congestion control, such as ECN or WRED, which is applied to a respective fraction of the packets that are queued for transmission to network 24 when the effective congestion level passes the threshold. (Multiple different thresholds may be applied to a given queue, whereby logic 38 sends congestion notifications when the effective congestion level passes a certain lower threshold and drops packets when the effective congestion level passes another, higher threshold, for example.) Additionally or alternatively, control logic 38 can apply adaptive routing to choose a new routing path for the packets in a given queue when the effective congestion level for the queue passes a certain threshold. The term "adaptive routing" as used herein is not limited to classical Layer 3 network routing, but rather includes, as well, other sorts of adaptive forwarding of packets when multiple alternative paths through the network are available.

Although control logic 38 is shown in FIG. 1 as a single functional block, in practice logic 38 typically carries out multiple functions, including (but not limited to) the functions shown below in FIG. 2. In a high-speed network switch, these functions are typically implemented in hard-wired or programmable logic, which may be part of a single chip or chip set together with ports 22 and other components that will be apparent to those skilled in the art. Additionally or alternatively, at some of the functions of logic 38 may be implemented in software running on a suitable embedded or stand-alone microprocessor.

Furthermore, although the present description relates, for the sake of concreteness and clarity, to the specific switch 20 that is shown in FIG. 1, the principles of the present invention may similarly be applied, mutatis mutandis, to any network element that implements the sorts of congestion control techniques that are described herein. Thus, in alternative embodiments, these principles may be applied not only in different types of switching apparatus, such as routers and bridges, but also, for example, in advanced network interface controllers that connect a host computer to a network. Furthermore, although the present embodiments relate particularly to congestion control in IP networks and make use of techniques, such as ECN, that have been defined specifically for such networks, the principles of the present invention may alternatively be applied in other sorts of networks and under different protocols to which congestion control is relevant, such as InfiniBand and Ethernet.

Figure 2:
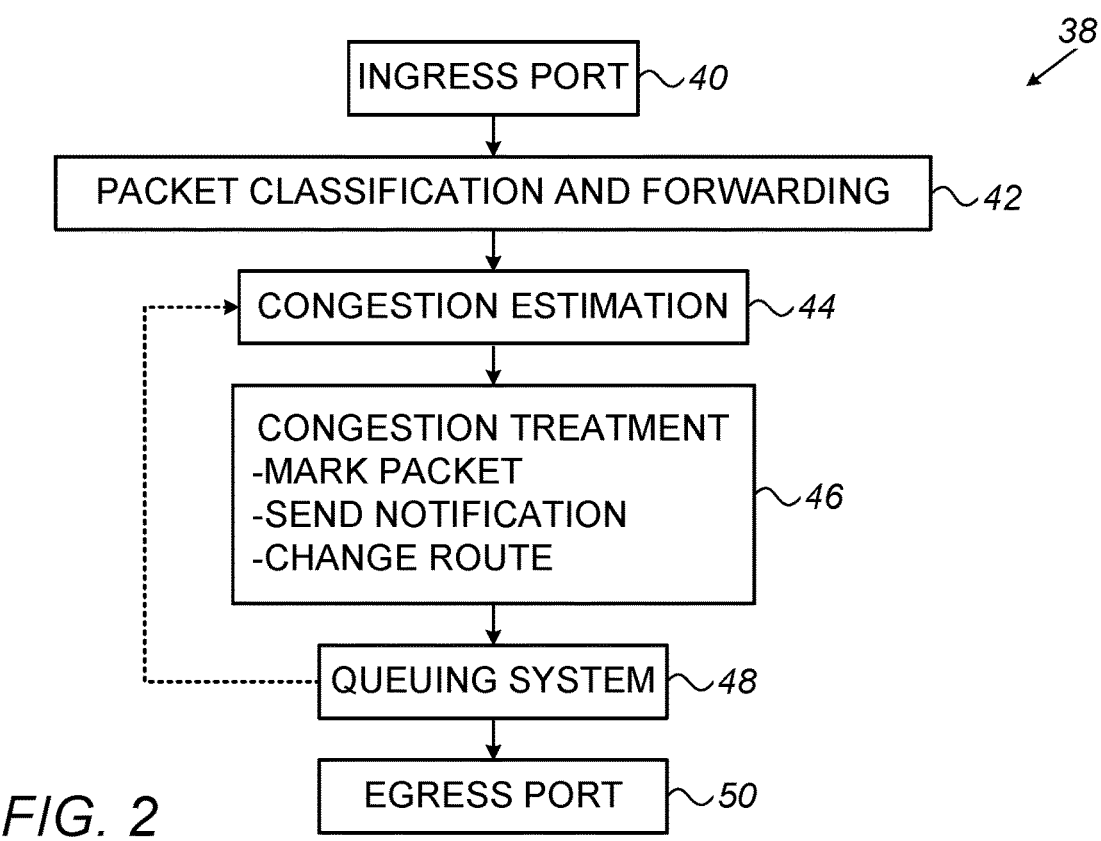
FIG. 2 is a flow chart that schematically illustrates a method for packet processing with congestion control, in accordance with an embodiment of the invention.

FIG. 2 is a flow chart that schematically illustrates a method for packet processing with congestion control, in accordance with an embodiment of the invention. The method is described hereinbelow, for the sake of convenience and clarity, with reference to the elements of switch 20, as shown in FIG. 1. Specifically, the method begins with reception of a packet, such as packet 26, at switch 20 through one of ports 22, serving as an ingress interface 40, and ends with transmission of the packet through another port 22, serving as an egress interface 50. The intermediate steps of the method are carried out by control logic 38.

For each incoming packet 26, packet classification and forwarding logic 42 (within control logic 38) parses and processes header 28 in order to classify the packet priority level and identify the egress port through which the packet is to be forwarded. To the extent that switch is configured for adaptive routing, logic 42 may identify multiple candidate egress ports for the packet. Based on the chosen egress port and priority level, logic specifies the egress queue for the packet, which is meanwhile held in memory 36.

A congestion level estimator 44 calculates the effective congestion level for the chosen queue. For this purpose, estimator 44 calculates, a respective interface congestion level I for each port 22, based on the queue lengths of the queues associated with the port, i.e., the queues for which the port is to serve as the egress interface. For example, the interface congestion level may be based on a sum of the queue lengths: $I = k \Sigma_{queues} L$, wherein k is a normalization constant (which may be set equal to one). Estimator 44 then computes the effective congestion level C for each queue as a weighted sum of the respective queue length L and the corresponding interface congestion level I, weighted by a certain weighting factor β: $C = L + \beta * I$.

In general, β is configurable for each priority level (traffic class) and varies inversely with the queue priority, as explained above. For example, β may be set for each queue to a value between 0 and 1, with β=0 for the queues with highest priority and β=1 for the queues with lowest priority. In a weighted round-robin scheduler, for instance, the congestion weighting factor β for each queue will typically be inversely proportional to the weight allocated to the queue by the scheduler. (When all queues have the same weight in the scheduler, β can be set to 1 for all queues.) The function that is applied by congestion estimator 44 in setting β may vary from port to port. Furthermore, when logic 38 applies a hierarchical scheduling policy, estimator 44 can calculate the effective congestion levels over multiple scheduling levels of the hierarchy.

Congestion control logic 46 compares the effective congestion level C for each queue to a threshold, or a set of thresholds, in order to choose a congestion treatment to apply to the packets in the queue. For example:

When C passes an applicable congestion notification threshold for a given queue, logic 46 marks congestion notification field 32 in a certain fraction of packets 34, or all of the packets, that are transmitted to network 24 from switch 20. Alternatively or additionally, logic 46 may send quantized congestion notification (QCN) packets back to the source of the congesting packets. In this latter case, the quantized congestion feedback can reflect the effective congestion level of the queue in question.

When C passes an applicable packet discard threshold for a given queue, logic 46 drops a fraction of the packets from the queue and does not transmit them on to network 24. In cases of extreme congestion, all of the packets in the queue may be dropped.

When C passes an adaptive routing threshold, logic 46 evaluates alternative routing paths, if available, and reroutes the next packet or packets to a different queue corresponding to the new routing path.

Assuming the thresholds to be the same for all queues, the higher value of β that is assigned to low-priority queues means that congestion control logic 46 will generally apply the above congestion treatments more aggressively to the low-priority queues than to higher-priority queues. Alternatively, different queues may have different thresholds.

Once the final target queue for a given packet has been determined, control logic 38 passes the packet to a queuing system 48, which arbitrates among the queues and delivers each packet from memory 36 to its assigned egress port 50 for transmission. Queuing system 48 meanwhile monitors the queue lengths and delivers the queue length values L to congestion estimator 44, which updates the interface congestion levels and effective congestion levels accordingly, as described above.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
   multiple interfaces configured for connection to a packet data network as ingress and egress interfaces of the apparatus;
   a memory coupled to the interfaces and configured to contain packets awaiting transmission to the network in multiple queues, which are associated with respective egress interfaces and are assigned respective transmission priorities; and
   control logic, which is configured:
   to assign to the queues respective weighting factors, such that the weighting factors of the queues vary inversely with the respective transmission priorities of the queues;

to calculate for each egress interface a respective interface congestion level based on respective queue lengths of a plurality of the multiple queues that are associated with the egress interface;

to calculate effective congestion levels for the queues, the congestion level of each given queue being calculated as a function of the length of the given queue and of the respective interface congestion level, weighted by the respective weighting factor of the given queue;

to compare the calculated effective congestion levels to a set of thresholds;

to reroute packets from queues whose effective congestion levels are above a first threshold to other queues; and to apply congestion control to queues whose effective congestion levels are above a second threshold.

2. The apparatus according to claim 1, wherein the weighted function comprises a weighted sum, in which the respective interface congestion level is weighted by the respective weighting factors of the queues.

3. The apparatus according to claim 2, wherein the weighting factors are assigned values between zero, for the queues having a highest priority level, and one, for the queues having a lowest priority level.

4. The apparatus according to claim 1, wherein the control logic is configured to send congestion notifications over the network when an effective congestion level for a given queue exceeds the second threshold.

5. The apparatus according to claim 1, wherein the control logic is configured to drop packets from a queue when an effective congestion level of the queue exceeds the second threshold.

6. A method for communication, comprising:

holding packets awaiting transmission from a network element to a network in multiple queues, which are associated with respective egress interfaces of the network element and are assigned respective transmission priorities;

assigning to the queues respective weighting factors, such that the weighting factors of the queues vary inversely with the respective transmission priorities of the queues;

calculating for each egress interface a respective interface congestion level based on respective queue lengths of a plurality of the multiple queues that are associated with the egress interface;

calculating effective congestion levels for the queues, the congestion level of each given queue being calculated as a function of the length of the given queue and of the respective interface congestion level, weighted by the respective weighting factor of the given queue;

comparing the calculated effective congestion levels to a set of thresholds;

rerouting packets from queues whose effective congestion levels are above a first threshold to other queues; and applying congestion control to queues whose effective congestion levels are above a second threshold.

7. The method according to claim 6, wherein the weighted function comprises a weighted sum, in which the respective interface congestion level is weighted by the respective weighting factors of the queues.

8. The method according to claim 7, wherein the weighting factors are assigned values between zero, for the queues having a highest priority level, and one, for the queues having a lowest priority level.

9. The method according to claim 6, wherein applying the congestion control comprises sending congestion notifications over the network when an effective congestion level for a given queue exceeds the second threshold.

10. The method according to claim 6, wherein applying the congestion control comprises dropping packets from a queue when an effective congestion level of the queue exceeds the second threshold.

11. The method according to claim 6, wherein the first and second thresholds are the same for all the queues.

12. The method according to claim 6, wherein the first and second thresholds have different values for different queues.

* * * * *